United States Patent [19]

Greenberg

[11] 3,978,271

[45] Aug. 31, 1976

[54] THIN METALLIC NICKEL-SILVER FILMS BY CHEMICAL REPLACEMENT

[75] Inventor: Charles B. Greenberg, Murrysville, Pa.

[73] Assignee: PPG Industries, Inc., Pittsburgh, Pa.

[22] Filed: Apr. 15, 1975

[21] Appl. No.: 568,351

[52] U.S. Cl. ............................... 428/433; 427/169; 427/164; 427/305; 427/306; 427/430; 428/457
[51] Int. Cl.² .......................................... C03C 17/14
[58] Field of Search ............ 427/169, 305, 306, 430; 428/433

[56] References Cited
UNITED STATES PATENTS 3,147,133  9/1964  Loiseleny .................... 427/169 X
3,920,864  11/1975  Greenberg et al. ............. 427/404 X

*Primary Examiner*—Ralph S. Kendall
*Attorney, Agent, or Firm*—E. Kears Pollock; Donna L. Seidel

[57] ABSTRACT

Thin films containing metallic silver and nickel are deposited on transparent articles according to the method of the present invention. A nickel-coated glass article having a reflective gray appearance is contacted with a solution comprising water, a silver salt and a complexing agent. The resultant article has a low reflectance surface, the color of which appears brown-gray to gray in fluorescent lighting.

17 Claims, No Drawings

THIN METALLIC NICKEL-SILVER FILMS BY CHEMICAL REPLACEMENT

BACKGROUND OF THE INVENTION

1. Field of the Invention

This invention relates broadly to methods of coating transparent articles such as glass. More particularly, this invention relates to methods for producing metallic nickel-silver films by chemical replacement reactions.

2. Description of the Prior Art

Transparent articles bearing a transparent metal film have been produced by a variety of well-known electroless or wet chemical coating or plating techniques. These techniques generally involve contacting the article to be coated with suitable solutions to deposit a metal film thereon by reducing the metal from a metal salt in the solution.

Autocatalytic coating techniques are known wherein a reducing agent such as an alkali metal hypophosphite or formaldehyde is present in a single solution with the metal salt. Such a solution is not usually susceptible to rapid reaction until it is placed in contact with a catalytic or sensitized surface. Autocatalytic techniques for the deposition of cobalt are described in U.S. Pat. No. 2,532,283 and 2,532,284 to Brenner and Riddell. Other techniques of this type are described in patents such as U.S. Pat. No. 2,956,900 to Carlson et al, relating to the deposition of nickel.

Exhaustive electroless coating techniques are also known. In these techniques, the reduction reaction proceeds rapidly when the reducing agent and the metal salt are present together in the coating solution. For this reason, such techniques usually require applying separate solutions of these reactants substantially simultaneously to the substrate to be coated. Among these techniques are those wherein a boron-containing reducing agent is employed, such as described in U.S. Pat. No. 3,671,281, to Miller and Cavitt for the deposition of iron, cobalt and nickel.

The reflectance and transmittance characteristics of a transparent article may also be modified by staining techniques whereby metals are introduced into the surface of the substrate. These staining techniques are described in U.S. Pat. No. 2,701,215 to Kroecl and U.S. Pat. No. 3,079,264 to Grego et al. Such techniques are not, however, coating techniques and do not result in a metal film on the surface of the substrate. Nor are such techniques replacement reactions since there is no metal film involved to be replaced.

Replacement reactions for bulk metals using immersion plating baths are known. As described in the *METAL FINISHING GUIDEBOOK DIRECTORY* for 1965, gold metal is known to replace copper in copper alloys at a temperature of 150°–180°F., using an immersion plating bath containing potassium gold cyanide, sodium cyanide and soda ash. It is also known that gold will replace silver after immersion for 24 hours in a plating bath containing sodium thiosulfate and gold chloride. However, the replacement reactions for bulk metals do not encounter the difficulties which arise when a transparent coated article is the desired product.

The preparation of thin, transparent films on transparent substrates, particularly on large sheets of glass for architectural applications, presents particular problems which are not present in the coating of opaque, especially opaque metal, substrates. In the coating of large, transparent articles for architectural use, it is extremely important that films of uniform thickness, transmittance and reflectivity be produced so that the articles will have a uniform aesthetic appearance. Films of the requisite uniformity have been prepared comprising various metals, including iron, cobalt, nickel, copper and silver, by direct deposition onto the substrate utilizing electroless coating techniques.

Patented electroless coating techniques have been employed with success in producing highly uniform films having an aesthetically pleasing appearance and high reflectivity for energy in the infrared range. Articles coated in accordance with these techniques are used in buildings to provide attractive viewing enclosures which effectively reflect solar energy, thus minimizing the load imposed on air conditioning systems servicing these buildings.

Commercial architectural products such as described above have been produced according to the teachings of U.S. Pat. No. 3,457,138 to Miller, which describes a method of making highly efficient infrared radiation reflective copper-silver films by the direct deposition of a copper film over a directly deposited silver film.

The first reference to replacement reactions in the art of transparent metal films is the copending application of Charles B. Greenberg and Peter P. Harmon, U.S. Ser. No. 384,763, now Pat. No. 3,920,864 which describes the replacement of copper by silver.

SUMMARY OF THE INVENTION

Transparent films comprising metallic silver and nickel are prepared on transparent substrates to yield transparent coated articles having a low reflectance brown-gray to gray appearance.

A thin metallic film of nickel is deposited on a transparent substrate by a known direct-deposition technique. The conventionally-coated article is then contacted with a silver-containing replacement solution according to the method of this invention. Silver from the solution replaces nickel in the film, resulting in a film comprising silver. The amount of nickel remaining in the film is determined by the extent of replacement. Slight, substantial, or essentially complete replacement of nickel is possible, depending on the length of contact. Large sheets of glass coated according to the method of this invention may be used as windows to control solar energy in applications in which high reflectance is undesirable.

In the practice of this invention, the surface of the substrate to be coated is first cleaned by conventional cleaning procedures. The surface of the substrate is then prepared for coating and a thin nickel film is deposited thereon by vapor deposition, sputtering, electrolytic deposition or electroless deposition. Electroless deposition, particularly according to the teachings of U.S. Patent No. 3,671,291 to Miller and Cavitt, is the preferred coating technique.

The nickel coated surface is then contacted with an aqueous solution of a silver salt and a complexing agent. This replacement solution is maintained in contact with the nickel film for a brief period during which silver from the silver salt in the solution replaces nickel in the film. The appearance of the film is observed to change during the exposure of the film to the replacement solution.

Transparent articles prepared according to the method of this invention may be used in architectural applications where the particular colors and low reflectance displayed by the articles are desirable.

DESCRIPTION OF THE PREFERRED EMBODIMENTS

Large sheets or plates of flat glass are coated according to this invention for use as windows. Sheets of clear, soda-lime-silica glass, each having a thickness of about 7/32 inch (0.56 cm.) and measuring about 4 feet by 6 feet (about 1.2 by 2 meters) are prepared for coating. A glass sheet is placed on a substantially horizontal conveyor and is conveyed to a cleaning section of a continuous coating line. In this section a plurality of rotating discs or blocks gently abrade the upper surface of the sheet, preferably with an aqueous slurry of a commercial glass cleaning compound. This loosens any dirt adhering to the glass. This operation, called a blocking operation, is preferably carried out using felt blocks, with each block rotated continuously at a rate of about 200 to 600 revolutions-per-minute. The blocks are preferably oscillated over a short amplitude in a direction transverse to the advancing sheet of glass to insure that the entire upper surface of the sheet is blocked. After blocking, the sheet advances beneath a plurality of rotary-cup brushes that wash the surface with tap water. The brushes are rotated and oscillated in a manner similar to the rotation and oscillation of the blocks. Each sheet then advances beneath a transverse brush or squeegee that is employed to sweep away the wash water used to clean the sheet. A continuous line apparatus, such as shown in U.S. Pat. No. 3,723,155 to Greenberg and Crissman, may be effectively employed in the practice of this invention.

After cleaning, each clean glass sheet is contacted with a dilute solution of a sensitizing agent for a short time, usually under ambient conditions at a temperature of 50°F. to 95°F. (20°C. to 35°C.). The glass sheet is then rinsed with water, preferably a relatively pure water, such as deionized or demineralized water. The sensitizing agent employed is preferably a tin salt. Any of a variety of salts may be employed in an aqueous solution to carry out the sensitizing step. For example, the following salts may be employed: stannous chloride, stannous bromide, stannous iodide, stannous sulfate, or the like. Stannous chloride is a preferred sensitizing agent.

After the glass sheet has been sensitized, it is preferably activated. This activation may be carried out according to the teachings of U.S. Pat. No. 2,702,253 to Bergstrom, using a palladium salt.

The activated glass sheet is then contacted substantially simultaneously with two sprays, one a nickel solution and the other a reducing solution. The sprays intermingle at the glass surface and a nickel film is deposited thereon. This is essentially the method disclosed in U.S. Pat. No. 3,671,291 to Miller and Cavitt for the deposition of iron, cobalt or nickel.

The nickel coated surface of the sheet is then contacted with a replacement solution containing an ammoniacal silver salt and a complexing agent, such as ethylenediamine, ethylenediamine tetraacetic acid, disodium ethylenediamine tetraacetate, tetrasodium ethylenediamine tetraacetate, excess ammonium hydroxide, ethylenediamine mono-d-tartrate, sodium citrate or a similar complexing agent. For best results, the replacement solution comprises, on the basis of one liter of water, 0.5 to 5 grams of silver nitrate and at least 0.5 cc. of ammonium hydroxide (28–30 percent assay). The amount of complexing agent varies with the choice of complexing agent. Preferred complexing agents include 0.5 to 20 grams per liter of sodium citrate, dihydrate, ammonium hydroxide in excess of 2 cc. per liter, or 0.5 to 8 grams per liter of disodium ethylenediamine tetraacetate. As much as 100 to 200 cc. per liter of excess ammonium hydroxide may be used without deleterious effect on the replacement reaction. The solution is maintained in contact with the nickel film for a brief period of time, from about 15 seconds to about 5 minutes, depending on the composition and concentration of the solution and the desired extent of replacement. An observable change in appearance is evidence of the replacement reaction.

The replacement solution is then rinsed from the nickel-silver coated surface with water and the sheet may be air-dried.

The resultant coated sheet has observably different properties from the original nickel-coated sheet. The luminous transmittance is decreased and the color observed by transmission has acquired a bluish characteristic. The color of reflected light has changed from the characteristic nickel-gray to a brown-gray when observed in fluorescent lighting.

The present invention will be further understood from the description of specific examples which follow.

EXAMPLE I

Sheets of clear soda-lime-silica glass are cleaned, sensitized, activated, and coated with nickel as described above to yield coated sheets having a reflective, gray appearance. The luminous transmittance is 30 percent.

The coated sheets of glass are contacted on the coated surfaces at ambient temperature with a replacement solution comprising water, 1.0 gram per liter silver nitrate and 6.0 cc. per liter ammonium hydroxide (28-30 percent assay).

After 30 seconds of contact with the film, the replacement solution is rinsed away with water and the sheet is dried with air. The resultant coated sheet has a luminous transmittance of 23 percent. The untreated surface of the sheet appears brown-gray to gray in fluorescent lighting with a luminous reflectance of 14 percent.

EXAMPLE II

Sheets of clear soda-lime-silica glass are cleaned, sensitized, activated, and coated with nickel as in Example I.

The nickel coated surfaces of the sheets are then contacted with an aqueous replacement solution comprising water, 1.0 gram per liter silver nitrate, 1.0 cc. per liter ammonium hydroxide (28 percent assay) and 3.8 gram per liter sodium citrate, dihydrate.

After maintaining contact with the film for 40 seconds, the replacement solution is rinsed away with water and the sheet is dried.

The result is a coated sheet bearing a metallic silver-nickel film as in Example I, but with a luminous transmittance of 20 percent and a reflectance from the glass surface of 15 percent. The coated sheet appears brown-gray to gray in fluorescent lighting.

EXAMPLE III

Sheets of clear soda-lime-silica glass are cleaned, sensitized, activated, and coated with nickel as in Example I. The resultant nickel-coated sheets have a luminous transmittance of 29 percent.

The nickel-coated surfaces of the sheets are then contacted with an aqueous replacement solution comprising water, 1.0 gram per liter silver nitrate, 1.0 cc. per liter ammonium hydroxide (28 percent assay), and 3.0 gram per liter disodium ethylenediamine tetraacetate.

After maintaining the solution in contact with the film for 45 seconds, the solution is rinsed away and the surface dried.

The resultant silver-nickel coated sheet has luminous transmittance of 23 percent.

The above examples are offered in illustration and are not intended to limit the scope of Applicant's claimed invention. For example, substrates other than glass, such as polymeric materials, may be coated according to the methods of this invention. Other complexing agents than those mentioned herein may be effective to promote the replacement reaction. Although normal ambient temperatures are preferred, higher or lower temperatures may be employed, resulting in shorter or longer reaction times. It will be evident to those skilled in the art that variations and modifications may be made to the disclosed method of preparing silver-nickel films by chemical replacement without departing from the spirit of this invention.

I claim:

1. A method of preparing a metallic film of silver and nickel on a non-metallic substrate comprising the steps of:
   a. sensitizing a surface of the substrate;
   b. applying a nickel film to the sensitized surface;
   c. contacting the nickel film with a replacement solution containing an ammoniacal silver salt and a nickel complexing agent for a period of time sufficient to replace at least a portion of the nickel in the film by silver.

2. The method according to claim 1 wherein the nickel film is contacted with an aqueous solution comprising ammoniacal silver nitrate and a complexing agent.

3. The method according to claim 2 wherein the nickel film is contacted with an aqueous solution of ammoniacal silver nitrate and a complexing agent selected from the group consisting of sodium citrate (dihydrate), disodium ethylenediamine tetraacetate, and ammonium hydroxide.

4. The method according to claim 3 wherein the step of contacting the nickel film is accomplished with a solution comprising:
   a. water;
   b. 0.5 – 5 grams per liter silver nitrate;
   c. 0.5 to 100 cc. per liter ammonium hydroxide (28 to 30 percent assay); and
   d. the selected complexing agent.

5. The method according to claim 4 wherein the complexing agent is ammonium hydroxide and the total concentration of ammonium hydroxide (28 to 30 percent assay) in the replacement solution is from at least 2 cc. per liter to as much as 200 cc. per liter.

6. The method according to claim 4 wherein the complexing agent is from about 0.5 to about 20 grams per liter of sodium citrate, dihydrate.

7. The method according to claim 4 wherein the complexing agent is from about 0.5 to about 8 grams per liter of disodium ethylenediamine tetraacetate.

8. A method of preparing a metallic film of silver and nickel on a glass sheet comprising the steps of:
   a. sensitizing a surface of the glass sheet;
   b. applying a nickel film to the sensitized surface; and
   c. contacting said nickel film with a solution comprising water, an ammoniacal silver salt and a nickel complexing agent.

9. The method according to claim 8 wherein the nickel film is contacted with an aqueous solution of ammoniacal silver nitrate and a complexing agent.

10. The method according to claim 8 wherein the nickel film is contacted with a solution containing:
    a. water;
    b. 0.5 to 5.0 gram per liter silver nitrate; and
    c. 0.5 to 50 cc. per liter ammonium hydroxide (28 percent assay); and
    d. a nickel complexing agent.

11. The method according to claim 10 wherein the complexing agent is ammonium hydroxide and the total concentration of ammonium hydroxide (28 to 30 percent assay) in the replacement solution is from at least about 2 cc. per liter to as much as about 100 cc. per liter.

12. The method according to claim 10 wherein the complexing agent is from about 0.5 to about 20 grams per liter of sodium citrate, dihydrate.

13. The method according to claim 10 wherein the complexing agent is from about 0.5 to about 8 grams per liter disodium ethylenediamine tetraacetate.

14. The method according to claim 8 wherein the glass sheet is a clear glass sheet.

15. A coated article prepared according to the method of claim 1.

16. A coated glass sheet prepared according to the method of claim 8.

17. A coated glass sheet prepared according to the method of claim 14.

* * * * *